United States Patent [19]

Kohno et al.

[11] Patent Number: 5,698,798
[45] Date of Patent: Dec. 16, 1997

[54] METHOD AND APPARATUS FOR DYNAMIC OBSERVATION OF SPECIMEN

[75] Inventors: Makiko Kohno, Kawasaki; Shigeyuki Hosoki, Hachiouji; Tsuyoshi Hasegawa, Meguro-ku; Yusuke Yajima, Kokubunji; Toshio Katsuyama, Oume, all of Japan

[73] Assignee: Hitachi, Ltd., Tokyo, Japan

[21] Appl. No.: 411,316

[22] Filed: Mar. 28, 1995

[30] Foreign Application Priority Data

Mar. 30, 1994 [JP] Japan .................. 6-60556

[51] Int. Cl.$^6$ .............. G01D 21/00; G01N 25/00; G01N 33/00; G01N 23/00
[52] U.S. Cl. .............. 73/866.5; 73/611; 73/105; 250/307; 374/45
[58] Field of Search ............... 73/866.5, 865.6, 73/104, 105, 611, 625, 628, 641; 374/45; 250/306, 307

[56] References Cited

U.S. PATENT DOCUMENTS

| | | | |
|---|---|---|---|
| 3,339,403 | 9/1967 | Barnes | 73/611 |
| 3,541,840 | 11/1970 | Phelan | 73/641 X |
| 3,568,642 | 3/1971 | Flaherty et al. | 73/625 X |
| 4,183,241 | 1/1980 | Fainzilberg et al. | 374/26 |
| 4,383,770 | 5/1983 | Boschung et al. | 374/25 |
| 4,861,167 | 8/1989 | Lobo et al. | 374/44 |

FOREIGN PATENT DOCUMENTS

| | | | |
|---|---|---|---|
| 52459 | 3/1987 | Japan | 73/625 |
| 166160 | 1/1965 | U.S.S.R. | 73/611 |

OTHER PUBLICATIONS

Nature, vol. 363, 1993, "Image standing waves in a two-dimensional electron gas", Crommie et al, pp. 524–527 Jun. 10, 1993.

Electron Ion Beam Handbook, pp. 658–663 published by Mar. 1994 (in Japanese).

Physical Review Letters, vol. 55, No. 21, "Novel Interference Effects between Parallel Quantum Wells", S. Datta et al, pp. 2344–2347 Nov. 18, 1985.

Science, vol. 262, Oct. 8, 1993, "Confinement of Electrons to Quantum Corrals on a Metal Surface", Crommie et al, pp. 218–220.

Patent Abstracts of Japan vol. 9, No. 72, Grp p. 345 ABS pub date Apr. 2, 1985 (59–203959) "Measuring Device for Blood Clotting Time".

Patent Abstracts of Japan vol. 9, No. 105 Grp p. 354 ABS pub date May 9, 1985 (59–228167) "Time Measuring Apparatus of Blood Cogulation".

*Primary Examiner*—Thomas P. Noland
*Attorney, Agent, or Firm*—Fay, Sharpe, Beall, Fagan, Minnich & McKee

[57] ABSTRACT

In a measuring method and a measuring apparatus which are suited for observing a dynamic physical phenomenon particularly in a microdevice, a signal for generating a physical phenomenon in a specimen is inputted to the specimen, and a signal which is caused by this dynamic physical phenomenon is detected by a probe which is close to or in contact with the specimen surface in correspondence with a signal input to the specimen on the basis of the specific time. The measuring apparatus has a scanning probe microscope with a probe (tip) which is close to or in contact with the specimen surface, a pulse voltage application control unit for applying respective pulse voltages to the specimen and probe, and a signal measuring unit for measuring a signal from the specimen detected by the probe. The measuring apparatus causes a dynamic physical phenomenon in the specimen by applying the pulse voltage to the specimen, applies a bias voltage between the probe and specimen by applying the pulse voltage to the probe, and detects the signal caused by the dynamic physical phenomenon in the specimen. Pulse voltage application to the probe is executed by the pulse voltage application control unit in correspondence with pulse voltage application to the specimen on the basis of the specific time. A dynamic physical phenomenon in a microarea of a specimen which is caused by the particle property or wave property of electrons can thus be observed.

8 Claims, 7 Drawing Sheets

METHOD AND APPARATUS FOR DYNAMIC OBSERVATION OF SPECIMEN

BACKGROUND OF THE INVENTION

The present invention relates to a method and apparatus for device operation evaluation used for characterization of a quantum-effect device material, evaluation of LSI, and others.

At present, computer devices have undergone further miniaturization and speeding up, the development of which has taken two directions. One direction is the development of devices using physical phenomena based on quantum theory in a microarea, such as a quantum wave of a quantum wire or a quantum wave in a smaller structure. The other direction is the progress of the current miniaturization of ULSIs. In the development of these devices, the art for observing and evaluating the operation status of each device is essential.

The operation evaluation for a quantum wave device is executed by observing a quantum wave which is generated mainly on the surface of the device. The quantum wave is caused by the wave property of charged particles such as electrons and ions and may be called a material wave (de Broglie wave). The change of this quantum wave with time and space is expressed by a wave function, and the quantum wave is classified into two types such as a propagating wave and a standing wave depending on whether it changes with time or not. The wave function of the propagating wave is expressed by the following equation.

$$\Psi(x, t) = A(x, t)\exp\left(ikx - i\frac{E}{\hbar}t\right) \quad (1)$$

where it is defined that $k=2\pi/\lambda$ and $E=2m/(\hbar k)^2$ and k indicates the wave number, x is the coordinate of a propagating wave, t is the time, $\lambda$ is the wave length, m is the mass (effective mass) of charged particles, and $\hbar$ is Planck's constant. The propagating wave is a wave which changes with time. On the other hand, although the wave function of the standing wave varies with the boundary condition, it is expressed, for example, by the following equation.

$$\phi(x) = (A\sin\omega t + B\cos\omega t)\sin\frac{n\pi x}{L} \quad (2)$$

where $\omega$ indicates the angular frequency, A, B, and L are constants, and n is an integer greater than 1.

The probability that charged particles for generating the quantum wave which is expressed by each of the wave functions mentioned above exist as particles at the specific location at the specific time is obtained as a density of probability which is expressed by the wave function squared. An example of measuring the quantum wave due to the wave property of electrons (hereinafter called an electron wave) is reported in the paper of M. F. Crommie et al. (Nature, Vol. 363 (1993), p. 524 to 527). In this paper, an electron wave due to local vibration of electrons at a step edge or point defect on the surface of a copper single crystal sample is observed. At the step edges or point defects, electrons on the sample surface repeat movement in the surface area which is closed by a high-energy barrier, so that an electron wave which is generated in this area is a standing wave.

Crommie and others observe the electron wave generated in this area as an electronic state density on the specimen surface (density of existence probability of electrons at the specific energy level) by a scanning tunneling microscope, which can measure a tunneling current generated between the solid surface and the tip approaching the surface due to penetration of the wave function of quantum theory at the atomic resolution. The scanning tunneling microscope (STM) uses a tunnel current It as shown below.

$$It \propto \int_0^{eV} \rho^s(E)T(E, eV)dE \quad (3)$$

where $\rho^s(E)$ indicates the density of state of electrons at the energy level E on the sample surface and T(E, eV) indicates the tunneling probability of electrons at the energy E.

As the equation shows, the tunneling current reflects by the density of state function of electrons on the sample surface. In the STM, the tip position is controlled by the feedback-loop circuit connected to a piezoelectric actuator to keep the tunneling current It constant. At present, the time resolution of the STM is decided by the piezoelectric material and the response thereof is about 1 kHz. In this paper, the electron wave as a standing wave is observed at some energy levels E by applying modulation to the bias voltage between the sample surface and tip and the results are reported.

On the other hand, as a means for operation evaluation of ULSIs, a scanning probe microscope (stroboscopic SEM) is known and the outline thereof is described, for example, in "Electron Ion Beam Handbook", p. 658. The stroboscopic SEM is used as a means for analyzing defects by scanning the device circuit by an electron beam and evaluating a change in the circuit voltage at high speed. From this function, the stroboscopic SEM is called an electron beam tester (EB tester). The stroboscopic SEM has a high time resolution, so that a high-speed dynamic change in the circuit of a ULSI can be observed.

SUMMARY OF THE INVENTION

An electron wave device as a kind of a quantum wave device functions by generating a quantum wave due to the wave property of electrons (hereinafter called an electron wave) on the surface having the device formed thereon, or by making a plurality of electron waves interfere with each other. As an electron wave device, for example, a Mach-Zehnder electron wave interference device (S. Datta, et al., Phys. Rev. Lett., Vol. 55 (1985), p. 2344) shown in FIG. 2 has been designed. This device utilizes a phenomenon that an electron wave traveling through a wave guide 8 branches to two paths 9, 10 having different effective lengths then the branched waves passing through these paths join at an electrode 12, and interfere with each other. Such an electron wave as generating a physical phenomenon based on quantum theory in the microarea is a propagating wave which changes in a very short time compared with the time resolution of the STM (about 1 kHz). For example, when 50 mV is applied to a GaAs quantum wire of 1 micron in length, the time T required for the electron wave to move in this GaAs quantum wire at an absolute temperature of 1.7 K is as shown below.

$\mu = 1 \times 10^5$ cm$^2$/Vs

E=500 V/cm

Vg=$\mu$E=5×10$^7$ cm/S

T=1/Vg=2×10$^{-12}$ S=2 ps where $\mu$ indicates the mobility of electrons, E the electric field, and Vg the speed of electrons. To observe an electron wave which travels on the electron wave device surface at high speed like this, a time resolution of 1 ps (pico second)) or less is necessary. Therefore, it is impossible to observe an electron wave on the electron wave device surface by the STM as a density of electronic states on the device surface (density of existing electrons at the specific energy level of the device material) from a viewpoint of the time resolution. The stroboscopic SEM is a means for observing the behavior on the basis of the particle property of electrons, so that it is impossible in principle to observe an electron wave on the basis of the wave property of electrons. It has been a serious problem in the development of a microdevice using an electron wave that there is no means for observing a quantum wave traveling through a quantum wave device, together with device processing technologies.

On the other hand, the following problem is imposed in the operation evaluation method by the stroboscopic SEM for LSIs which whose refinement advances increasingly. For example, the wire width constituting the circuit of a 256-MB DRAM reaches 0.17 micron. However, although the current stroboscopic SEM has a time resolution enough to evaluate the operation, the space resolution is limited about 0.1 micron. To increase the space resolution of the stroboscopic SEM, it is necessary to focus the electron beam more. However, a sample is damaged by such a focused electron beam having a large current. Therefore, the stroboscopic SEM cannot correspond to future ULSIs in which high density packing advances to 256 MB or 1 GB.

As mentioned above, for dynamic evaluation of an ultra microdevice using a quantum wave, the conventional STM has not a time resolution enough to observe a traveling quantum wave and the stroboscopic SEM cannot observe the behavior caused by the wave property of electrons, so that neither of them can perform the observation of a quantum wave which is necessary for dynamic evaluation of a device. The stroboscopic SEM as a dynamic evaluation means for micro ULSIs using the behavior of electrons as particles cannot be used for ULSIs in which high density packing advances to 256 MB or 1 GB or more due to the limit of space resolution.

A subject and object of the present invention are to provide a method and apparatus having a high space resolution and a high time resolution for observing and evaluating the operation of a microdevice, which can simply execute observation of a quantum wave which exists as a propagating wave in a micro quantum wave device and dynamic evaluation of an ultra micro LSI device with low damage.

The above object is accomplished by the measuring method of the present invention, which brings a probe close to or in contact with the observation surface of a specimen such as a device, inputs a signal for generating a dynamic physical phenomenon in the specimen to the specimen, sets the origin of time, and detects a signal caused by a dynamic physical phenomenon in the specimen in correspondence with the signal input to the specimen by the probe on the basis of the time. The object of the present invention is also accomplished by another method of the present invention which sets the signal input time to the specimen as a reference time and detects a signal caused by a dynamic physical phenomenon in the specimen from the observation surface of the specimen after the specific time elapses after the reference time. It is desirable to repeat the signal input to the specimen and signal detection from the specimen when necessary or to change the interval between the observation position of the specimen or signal input time and the signal detection time. Particularly in observation of a quantum wave, it is desirable to repeat signal detection at the specific position of the specimen after the specific time elapses from the reference time, and to process the detected signal intensities at the specific time and specific position which are obtained by the repetition of signal detection statistically.

In the present invention, the probe is a general term for tips and canti-levers which are used in the aforementioned STM as well as a scanning tunneling spectroscope (STS), an atomic force microscope (AFM), a magnetic force microscope (MFM), and a tunneling acoustic microscope (TAM). A signal to be inputted to a specimen is, for example, electricity, light, an electromagnetic wave, or an acoustic wave. It is desirable to execute the signal input to a specimen and signal detection from a specimen intermittently. Furthermore, it is desirable to shorten the signal detection time from a sub-picosecond order to a nanosecond order.

The actual measuring method of the present invention comprises a step for holding a specimen on the specimen holder, a step for applying a scanning signal to a probe so as to scan the specimen surface, a step for applying a pulse signal to the specimen, a step for detecting a quantum wave generated by the pulse signal or a signal from the specimen, and either a step for synchronizing scanning signal generation and signal detection by setting the pulse signal generation as a time origin, or a step for measuring a signal change with time of a quantum wave or a signal from the specimen by setting the pulse signal generation as a time origin. The aforementioned measurement may be executed by cooling the specimen.

A measuring apparatus of the present invention consists of a specimen holder for holding a specimen, at least one probe for scanning the specimen, a measuring means for detecting a signal generated from the specimen by the probe and measuring the detected signal, a scanning means for scanning the probe, a scanning signal generation means for generating a scanning signal which is applied to the scanning means, a pulse signal generation means for generating a pulse signal which is applied to the specimen, and a synchronizing means for synchronizing signal detection from the specimen and scanning signal generation to be applied to the scanning means on the basis of the pulse signal generation time. It is desirable that the pulse signal generation means can generate an independent pulse from sub-picosecond (a 0.1 ps order) to about 1 ns in length repeatedly in a longer cycle. The pulse signal is a pulse electric signal, pulse light signal, pulse electromagnetic wave, or pulse acoustic wave. As to signal detection from the specimen, it is desirable to set the signal fetching time to an order of sub-picosecond to 1 ns.

When a plurality of probes are installed in the aforementioned measuring apparatus of the present invention, it is desirable to install a measuring means for detecting a signal generated from the specimen independently by the plurality of probes and measuring the detected signals independently, a scanning means for scanning the plurality of probes independently on the specimen surface, and a scanning signal generation means for generating scanning signals which are applied independently to the scanning means. It is desirable that the scanning means has a holding means for holding at least one of the probes at an optional position on the specimen.

Furthermore, in any of the aforementioned measuring apparatuses, a measuring means for measuring the changing time and changing amount of a pulse signal, a recording means for recording the changing amount and changing time of the pulse signal, or a cooling means for cooling the specimen may be installed.

Measurement of a high-speed phenomenon accompanied by a quantum effect such as a tunneling phenomenon in a microdevice using a scanning probe microscope (a general term for STM, STS, AFM, MFM, and TAM, hereinafter abbreviated to SPM) is impossible because the speeds of SPM control and scanning are extremely slow compared with the phenomenon. Such a phenomenon accompanied by a quantum effect is generated by inputting electricity, an electromagnetic wave, or a light signal to a device. By repeating signal input in a pulse shape, the same phenomenon can be reproduced in the device as the time elapses from the signal input time. Therefore, according to the present invention, by repeating the signal input to the device, scanning the SPM probe on the device surface (SPM scanning) every signal input on the basis of the respective signal input time as a reference time, and executing a probe measurement at the specific position (equivalent to a pixel) of the device at the specific time for the reference time, high speed phenomenon measurement in the device is made possible. The present invention enables not only high speed phenomenon observation in a microdevice but also measurement of the operation status of an LSI particularly having high integration of 256 MB or more. The signal input may be not only turned ON or OFF in a pulse shape but also changed stepwise. This is effective when an electron or an electron group flowing through the device by the first signal input prevents another electron or electron group from flowing into the device (i.e., Coulomb blockage). In this case, when the first signal is kept in the ON state for a little while and a second signal which has a higher intensity compared with the first signal is inputted, a new electron or electron group flows through the device.

Figure 3:
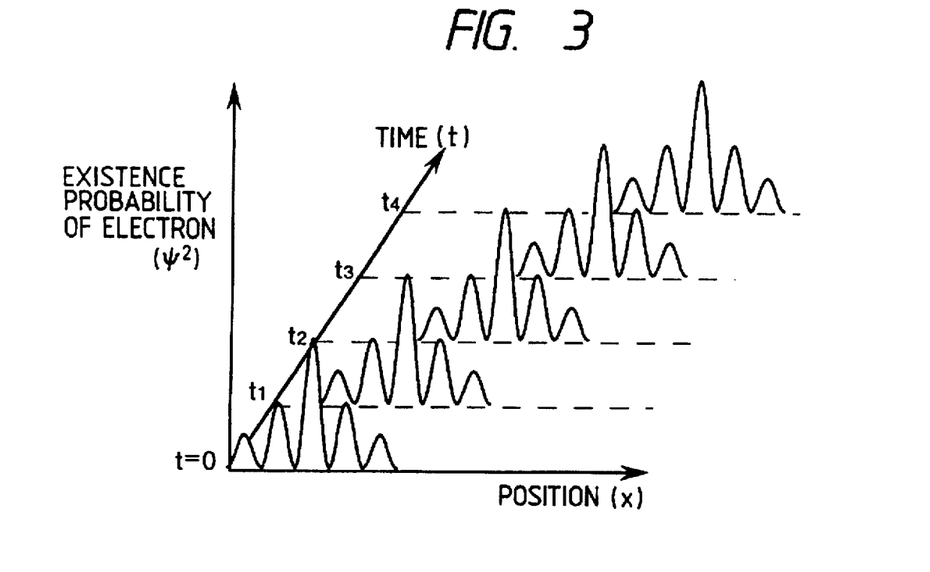
FIG. 3 is an illustration for the behavior of an electron wave in a quantum wire.

Before further explanation of the present invention, a dynamic phenomenon in a quantum wave device which is one of the measuring objects will be explained using an example of an electron wave which is generated by a single electron which passes through the quantum wire of the electron wave device, with reference to FIG. 3. In FIG. 3, the electron moving direction in the quantum wire is taken as x and the position of the electron wave in the quantum wire is indicated every time $t_n$ (n=1 to 4). In this case, the electron wave is assumed as a wave having four nodes, and expressed by an existence probability of an electron $\psi^2$ which is the square of the wave function $\psi$. As shown in FIG. 3, the part of quantum wire in which an electron exists is expressed as a height of $\psi^2$ having a width in the x direction. The dispersion of positions where a single electron exists at the specific time $t_n$ is caused by the uncertainty principle of the quantum theory and an electron exists as a particle only at one point (x) of the position which satisfies a condition of $\psi^2 > 0$ at this time. In the same way as with the aforementioned microdevice, the electron movement in this quantum wire and generation of an electron wave are caused by signal input to the quantum wire. Namely, the time tn shown in FIG. 3 is the specific time for the signal input time (reference time) respectively. Furthermore, by repeating the pulse-shaped signal input to the quantum wire or increasing the input signal intensity stepwise, the electron movement and electron wave generation are reproduced.

Figure 4:
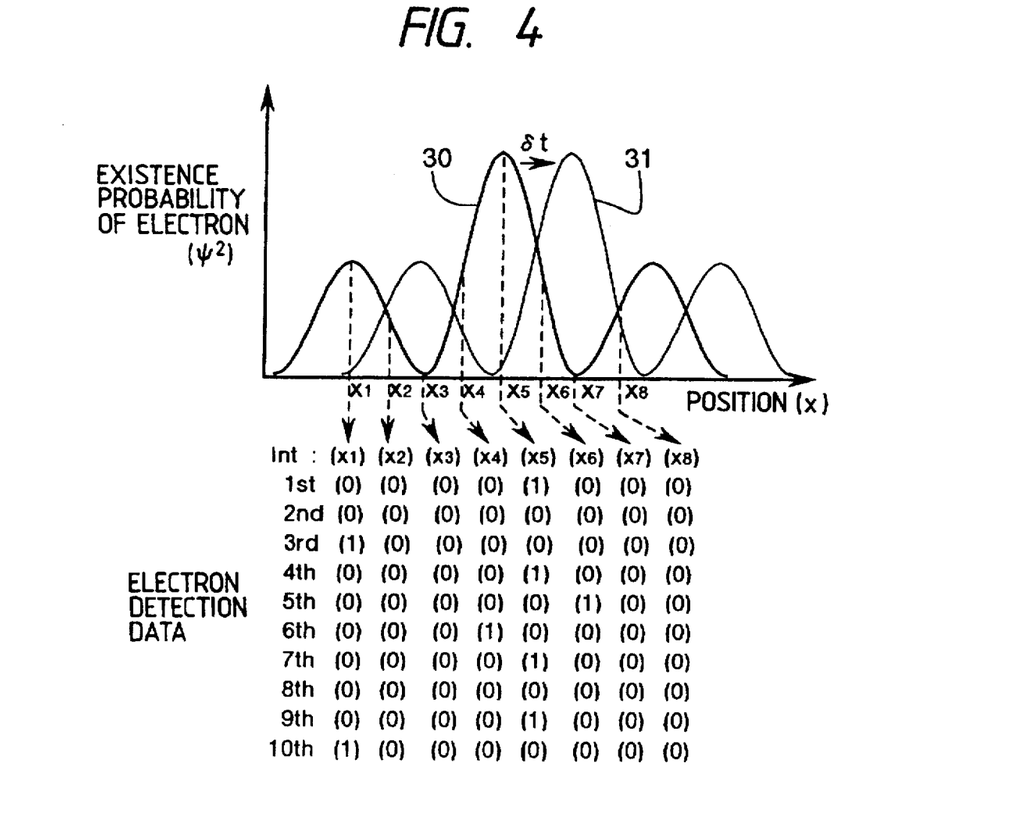
FIG. 4 is an illustration for observation of an electron wave according to the present invention.

The measuring method of the present invention will be explained using an example of observation of the aforementioned electron wave in the quantum wire. FIG. 4 indicates an electron wave 30 at the time $t_a$ and an electron wave 31 at the time $t_b$ after the time δt elapses from the time $t_a$ in the quantum wire as the square of the wave function $\psi^2$ respectively, on the basis of the time (t=0) when a single electron enters the quantum wire by applying a pulse-shaped voltage to both ends of the quantum wire (i.e. forming a potential gradient in the quantum wire for a microtime). In this case, it is assumed that the electron wave is a wave having two nodes.

The results when a single electron is detected by a probe at a plurality of positions x1 to x8 of the quantum wire at the time $t_a$ by the measuring method of the present invention are also shown. Electron detection is executed by measuring the tunneling current generated between the probe and quantum wire, Coulomb repulsion force, or magnetism.

When the tunneling current is to be measured, the bias voltage between the probe and quantum wire may be set to the energy level of an electron for generating the electron wave to be measured. When an electron is detected, (1) is shown. When no electron is detected, (0) is shown. The electron wave 30 or 31 is almost reproduced after the time of $t_a$ or $t_b$ elapses from the time when the pulse-shaped voltage is applied to the quantum wire respectively, so that for measurement of a single electron, the voltage is applied to the quantum wire repeatedly 10 times.

The position where a single electron exists at the time $t_a$ is one point which satisfies the condition $\psi^2 > 0$, so that the number of points where an electron can be detected at each measurement is 1 or 0 (other than the 8 measuring points). On the other hand, from a statistical viewpoint of 10 measurements, they are reflected by the probability of the electron existence which is almost shown by the wave function of an electron wave. The electron detection frequency at the position x5 where the probability is highest is maximum such (as 4). However, at x3 and x7 where the probability is 0, no electron is detected. As the comparison between the measurement results up to the 5th measurement and the measurement results up to the 10th measurement shows clearly, as the measurement repetition count or the number of measuring positions increases, the measurement results are clearly reflected by the electron existence probability. Therefore, by measuring a single electron as a particle at a plurality of positions repeatedly so as to obtain the distribution of single electron existence probability in the x direction, an electron wave generated by a single electron can be obtained as a wave function.

In the measuring method of the present invention, as the electron wave travels in the x direction, it is important to shorten the measuring time dt (data fetch time) at the time $t_a$. For example, when dt is about δt, a single electron at the time $t_b$ in which the distribution of electron existence probability in the x direction is quite different is detected together (an electron is detected at x3 and x7). To avoid this problem, the travel speed and wave length (de Broglie waves) of an electron wave to be measured are obtained from theoretical calculation beforehand, and the dt for which the effect of a deviation of the waveform of the electron wave with time can be ignored is calculated on the basis of these calculated values. Concretely, the value of dt is set in an order between sub-picosecond and ns depending on the specimen to be measured. It is desirable to acquire the detection signal, for example, by turning ON or OFF at high speed for the measuring time dt, the gate of the storage device for acquiring the detection signal from the probe or the bias voltage (when the tunneling current is detected) which is applied between the probe and quantum wire.

As mentioned above, the measuring method of the present invention makes it possible not only to measure an electron wave traveling through the quantum wire at the specific time but also to observe an electron wave passing the specific position of the quantum wire (for example, x=x1). In this case, the probe is kept (or held) at the specific position, and the electron detection time is changed stepwise, for example, from $t_a$ to $t_b$, and the signal input to the quantum wire is repeated at each step. It is important to set the detection time stepwise in consideration of the travel speed and wave length of an electron wave and to set the measuring time dt in the same concept as that of electron wave observation at the specific time.

As an actual electron wave device, there are overwhelmingly more kinds of devices which are spread two-dimensionally in the X and Y directions such as, for example, the aforementioned Mach-Zehnder device than a quantum wire which is extended one-dimensionally in the x direction. Therefore, for observation of a quantum wave at the specific time in the present invention, two-dimensional scanning with the probe is necessary. By doing this, although the number of measuring positions is increased from n to $n^2$ and the measuring time is also increased, the measuring time can be shortened by using a plurality of probes. When the probe is scanned by a piezoelectric material in the same way as with the conventional SPM, the scanning time decides the measuring time. Also from this viewpoint, the effect of using a plurality of probes is great.

By executing observation of a two-dimensional quantum wave at the specific time by changing the detection time stepwise according to the same procedure as that for the aforementioned observation at the specific position and showing the quantum wave observation data as an image in time series for the detection time, a quantum wave traveling through the quantum wave device can be seen as a moving image. This can be used not only for a quantum wave device but also for observation of ULSIs. Therefore, the present invention can replace the conventional stroboscopic SEM in dynamic observation of ULSIs which are refined with the advance of high density packing.

As mentioned above, according to the present invention, observation of a quantum wave of a microquantum device which is dynamic and cannot be observed, and evaluation of the operation status of a micro LSI, are made possible. By doing this, design and discovery of a defective part of a quantum device and discovery of an operation defective part of a ULSI that is at least 1 GB in length are made possible.

DETAILED DESCRIPTION OF THE EMBODIMENTS

The present invention will be explained in detail hereunder with respect to preferred embodiments thereof. The same symbols shown in FIGS. 1 to 9 indicate the same or similar parts.

Embodiment 1

Figure 1:
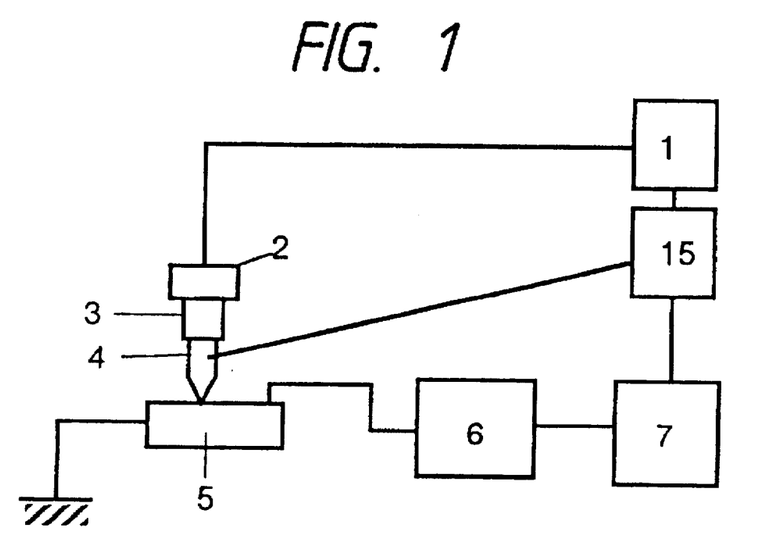
FIG. 1 is a block diagram of the apparatus of Embodiment 1 of the present invention.

Observation of a quantum wave of electrons in the electron wave device of the present invention will be explained. FIG. 1 is a drawing showing the constitution an of apparatus constructing according to this embodiment. A control unit 1 of a scanning probe microscope (SPM) controls a coarse motion mechanism 2 and a micromotion mechanism 3, and a probe 4 scans the surface of a specimen 5. A pulse voltage source 6 and a pulse voltage continuous application control unit 7 apply a bias voltage between the probe (tip) 4 and the surface of the specimen 5, and the pulse voltage source 6 irradiates a pulse signal to the electrode of the specimen 5. Voltage application to the electrode of the specimen 5 and the acquisition of a scan signal of the probe 4 are synchronized with each other, and a signal measuring unit 15 measures a signal from the specimen 5 which is detected by the probe 4. As a pulse signal, a pulse electric signal, a pulse light signal, a pulse electromagnetic wave, a pulse acoustic wave, or a pulse charged particle beam is inputted to the specimen 5. For detection of a quantum wave, current, voltage, light, or magnetism is used.

Next, observation of an electron wave device by the apparatus of this embodiment will be explained. First, the pulse voltage desired for observation is applied to the electrode of the structure supporting of the specimen 5 which is to be observed, for a suitable time and in a suitable cycle. The timing of the pulse voltage application at this time is synchronized with a scanning signal of the SPM. By doing this, the quantum wave to be observed can be generated always newly in the same state each time the data of each pixel is acquired.

For every application of the pulse voltage, the probe 4 scans the surface of the specimen 5 as required and stops (is held) at the quantum wave observation position on the surface of the specimen 5. According to this embodiment, the probe 4 is moved by the coarse motion mechanism 2 and the micromotion mechanism 3 for scanning on the surface of the specimen 5. However, the apparatus may be structured so that the probe 4 is fixed and the specimen 5 is moved.

When the probe 4 is in the holding state, an electron wave is detected as a potential by the probe (tip) of the SPM. The observation modes of the detection time for the pulse voltage application time, and of the value of the pulse voltage and other detection conditions of the electron wave, depend on the phenomenon to be observed.

Figure 6A:
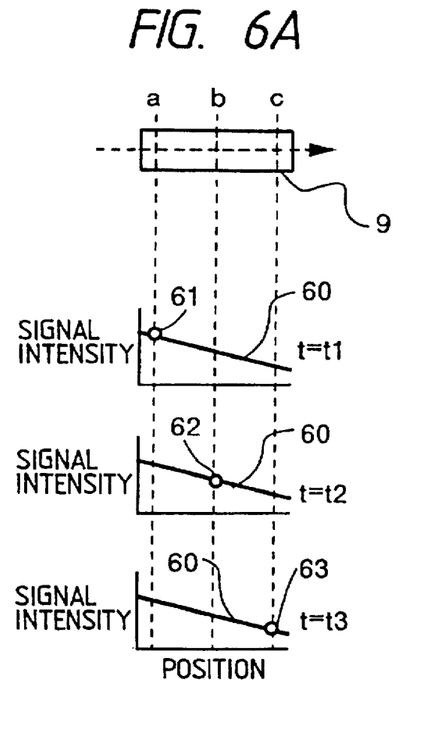
FIGS. 6A to 6C are illustrations for another electron wave observation method in Embodiment 1 of the present invention.
Figure 6B:
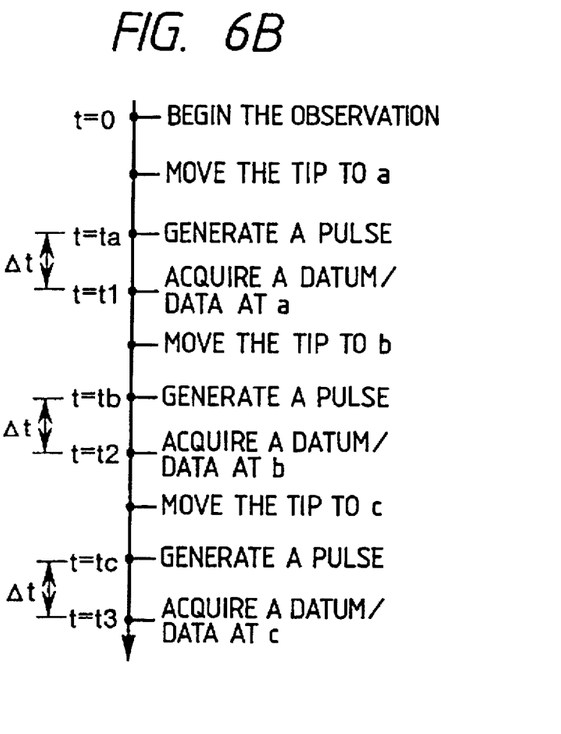
Figure 6C:
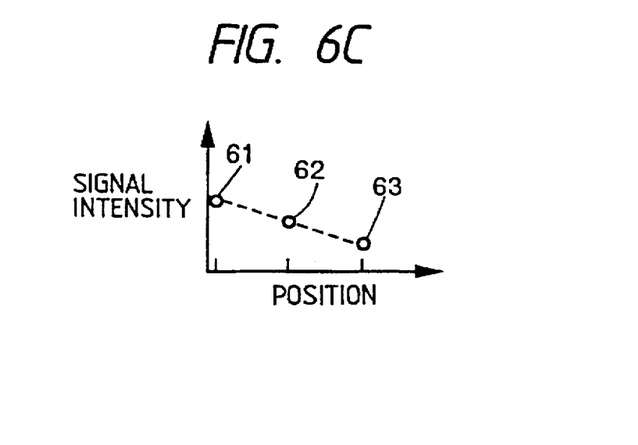

FIGS. 6A to 6C are illustrations for observation of an electron wave at specific times referenced to pulse voltage application times by the apparatus in this embodiment. FIG. 6A shows a position distribution 60 of an electron wave when a time of Δt elapses after the pulse voltage has been applied in an electron path (waveguide) 9. By the electron wave observation method of this embodiment after the time Δt elapses, the probe scans along the electron path 9 (in the direction of the dashed line) and acquires data at the points a, b, and c. The measuring procedure is shown in time series in FIG. 6B. As to data at each point, a quantum wave is generated repeatedly by applying the pulse voltage at each of $t_a$, $t_b$, and $t_c$ and data 61, 62, and 63 are acquired sequentially after the delay of time Δt from each time point. By plotting the acquired data on a coordinate plane having a transverse axis of position and an ordinate axis of signal intensity, the electron wave when the time Δt elapses after the pulse voltage application time is restructured as shown in FIG. 6C. However, in the case of a single electron, it is necessary to repeat the measurement many times as mentioned above so as to process them statistically due to the uncertainty principle.

Figure 5A:
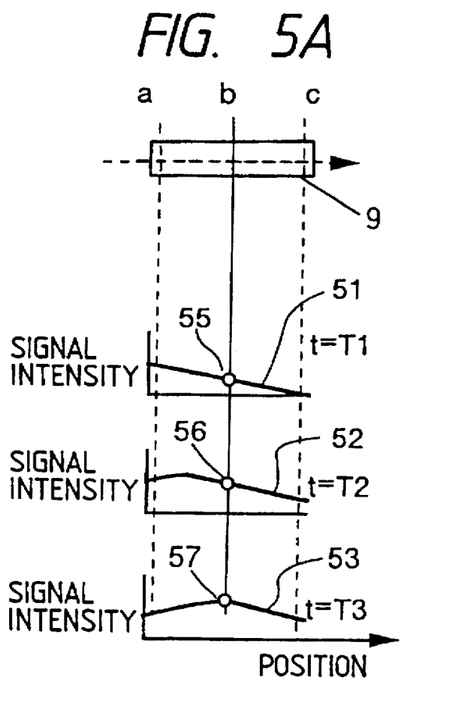
FIGS. 5A to 5C are illustrations for the electron wave observation method in Embodiment 1 of the present invention.
Figure 5B:
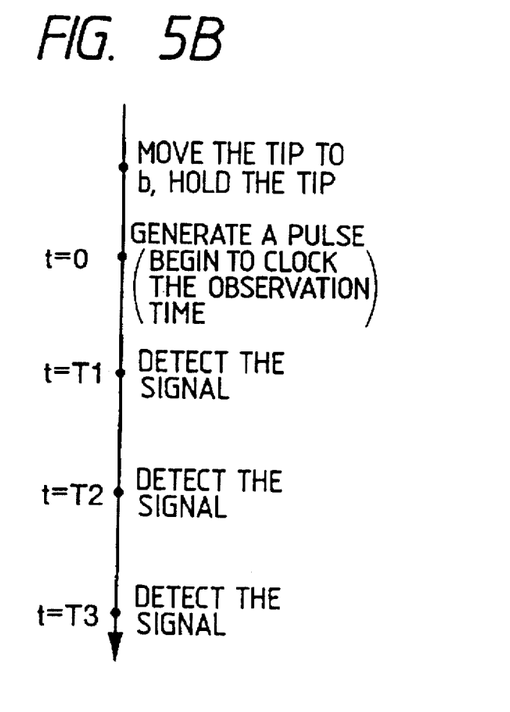
Figure 5C:
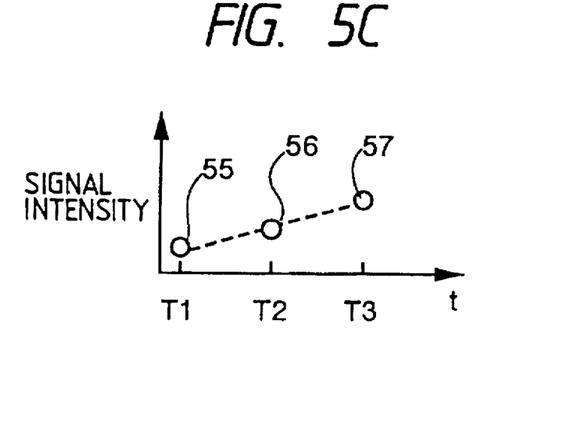

FIGS. 5A to 5C are illustrations for observation of a change with time of an electron wave at the specific position of the surface of the specimen by the apparatus in this embodiment. FIG. 5A shows position distributions 51, 52, and 53 of an electron wave when times of T1, T2, and T3 elapse after the pulse voltage application time in an electron path (waveguide) 9. These three electron wave position distributions indicate the status that an electron wave generated by the pulse voltage travels on the electron path 9 with time. The flow of measurement is shown in time series in FIG. 5B. The probe is brought close to the desired position b on the electron path 9 and put into the holding state (the feedback servo signal is turned off and the probe position is fixed), and a pulse signal is irradiated to the specimen. The pulse signal irradiation time is taken as t=0 and the times T1, T2, and T3 when the signal detected by the probe is changed and the variations at each time are recorded. When the time and variation (signal intensity) are plotted (restructured) in the ordinate and transverse axis respectively, FIG. 5C is obtained and the quantum wave traveling at the point B can be measured. By holding the probe and waiting for a change in a signal like this, phase differences and interference phenomena of a quantum wave traveling on a micro quantum device at a plurality of points can be observed.

Figure 2:
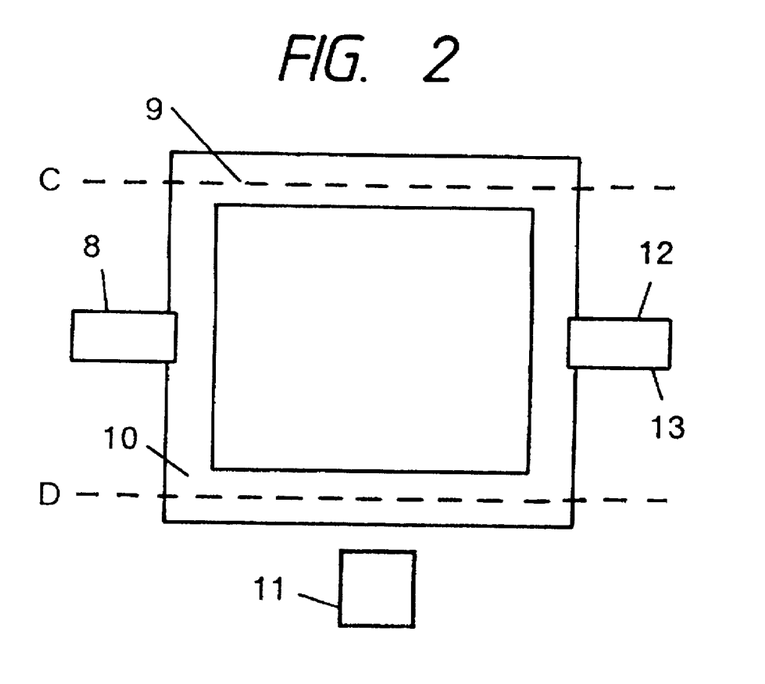
FIG. 2 is a block diagram of a Mach-Zehnder type electron wave interference device, which is a kind of quantum wave device.

Furthermore, observation of an electron wave in an electron wave device having a two-dimensional spread in the apparatus of this embodiment will be explained. FIG. 2 shows the structure of a device to be observed, which is called a Mach-Zehnder electron wave interference device. The size thereof depends on the mobility (temperature) of electrons and is considered to be within the range from micron (μm) to angstrom (Å). When a pulse voltage V is applied to the electrodes 8 and 12 by the pulse voltage source 6, a quantum wave is generated and divided into two directions and passes through the paths 9 and 10. When an electric field is given only to the path 10 by an electric field electrode 11, the quantum waves passing the paths 9 and 10 are different in phase. Namely, the quantum waves in the areas A and B indicate different statuses. Finally, the two different waves join and are outputted from the device exit. So far, only the last outputs are observed but the statuses of the quantum waves in the areas A and B on the way are not observed. Although the last outputs are the same, various combinations can be considered for the statuses of the quantum waves in the areas A and B, and it is important to confirm the statuses of the quantum waves in the areas A and B so as to design an actual device.

Figure 7:
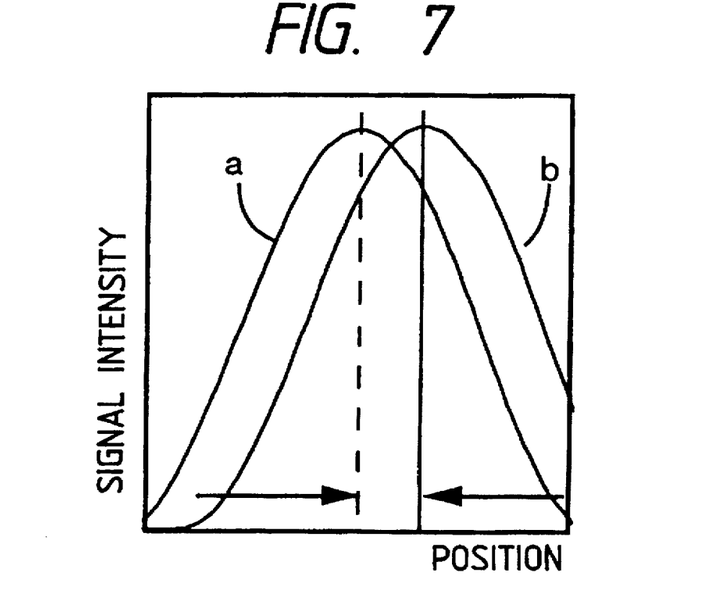
FIG. 7 is a drawing showing a quantum wave which is observed in Embodiment 1 of the present invention.

In this embodiment, although it varies slightly with the performance of the measurement system, for example, when the response speed is 1 ps, in measurement at a certain time T, a quantum wave is observed as a probability distribution that exists within a time of 1 ps. Therefore, as to measurement on the line C shown in FIG. 2, assuming that measurement is executed at each point on the line C (for example, at 256 points), the probe fetches data at the 256 points sequentially by letting a quantum wave appear 256 times repeatedly, and the distribution "a" shown in FIG. 7 can be obtained. On the other hand, in measurement on the line D in the same way, the waveform "b" shown in FIG. 7 is observed in the state that the phase is slightly shifted. When the response speed and repetitive frequency of the measurement system are set of the same order in time, the aforementioned observation can be executed. When the scanning on the lines C and D is executed overall, an image of electron density distribution can be drawn along each wire (groove). By doing this, the phase information of a quantum wave which is a high speed phenomenon can be measured by the SPM.

When the structure shown in FIG. 2 is small, single electron tunneling may occur. Due to the uncertainty principle in this case, for example, when a quantum wave is detected on the line C, no quantum wave is detected on the line D, so that it is necessary to repeat the aforementioned measurement many times and process them statistically.

By detecting a current, the apparatus of this embodiment can be used as an LSI evaluation apparatus. Also in this case, a pulse voltage is applied to the electrode of the circuit to be observed at a suitable frequency for a suitable time. The timing of the pulse voltage application at this time is synchronized with a scanning signal of the SPM. By doing this, the operation status to be observed can be generated always newly in the same state each time the data of each pixel is acquired. The space resolution in this case is decided by the space resolution of the SPM and the radius of curvature of the tip or probe, and a space resolution of an order of nanometer or more is obtained. The time resolution depends only on the pulse voltage to be applied and the synchronizing data fetch speed (performance of the measurement system), and a time resolution of an order of ps or more can be obtained.

According to this embodiment, the space resolution and time resolution which are necessary for evaluation of operations of a micro quantum device and ULSI can be added to the scanning probe microscope (SPM), so that observation of a quantum wave traveling in a micro quantum device and the phase thereof by the SPM, and evaluation of a micro LSI, are made possible. Detection of defective parts of an electron wave device which is necessary for designing a complicated electron wave device is thus made possible.

Embodiment 2

Figure 8:
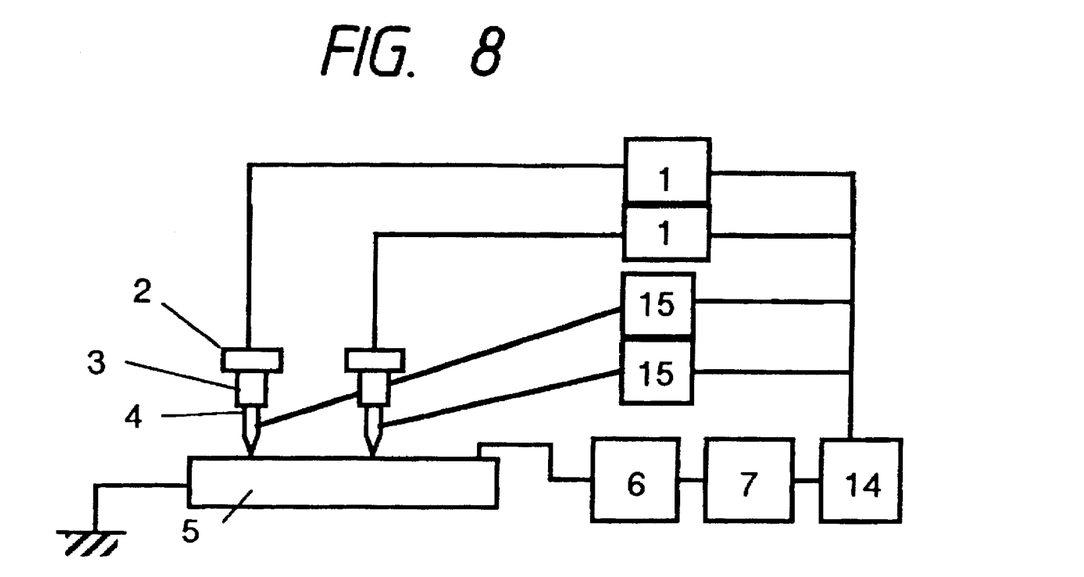
FIG. 8 is a block diagram of the apparatus of Embodiments 2 and 4 of the present invention.
Figure 9:
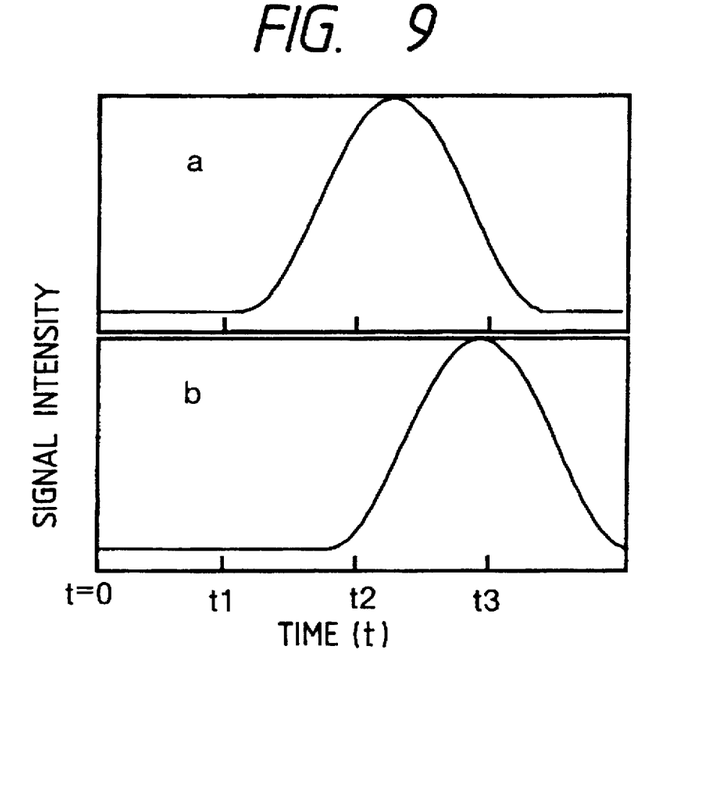
FIG. 9 is a drawing showing a quantum wave which is observed in Embodiment 2 of the present invention.

Observation of electrons in the electron wave device of the present invention will be explained hereunder. FIG. 8 is a drawing showing the constitution of an apparatus according to this embodiment. The apparatus of this embodiment is characterized in that it is structured so as to detect a signal from a specimen by a plurality of probes. A bias voltage is applied between each probe 4 and the surface of the specimen 5 by the pulse voltage source 6 and the pulse voltage continuous application control unit 7, and then a change in the signal which is caused by the voltage application is detected by the probe (tip) held in the neighborhood of the surface of the specimen 5 by the control unit 1 of the scanning probe microscope, the coarse motion mechanism 2, and the micromotion mechanism 3, and measured by the signal measuring unit 15. In this case, the time from the first application of the pulse voltage for the change of signal is also measured by the time measuring unit 14. The structure of the device to be observed is the same as that shown in FIG. 2. When a pulse voltage V is applied to the electrodes 8 and 12 at a suitable interval, a quantum wave is generated and divided into two directions and traverses the paths 9 and 10. The time when the pulse voltage is applied is taken as t=0.

When an electric field is given only to the path 10 by the electric field electrode 11, the waves traversing the paths 9 and 10 are different from each other. Namely, the quantum waves in the areas A and B are different from each other. In this case, the signal which is detected at the gate 13 is almost 0. Applying the pulse voltage V to the electrodes 8 and 12 at the time which is taken as t=0, the probe which is brought close to a point on the line C is held simultaneously (at t=0), and then the variation of the signal and the time are measured thereby (shown at "a" in FIG. 9). The exact same measurement is executed with another probe which is brought close to a point on the line D (shown at "b" in FIG. 9). By doing this, a difference in the phase between quantum waves traveling at different points can be observed.

When the specimen 5 is cooled by a cooling means 16 installed in the apparatus of this embodiment, the traveling speed of the quantum wave of electrons becomes slow and can be measured, so that the time and space measuring accuracy of a quantum wave can be improved. By cooling the specimen, quantum noise in measurement can be reduced, too.

Embodiment 3

Figure 10:
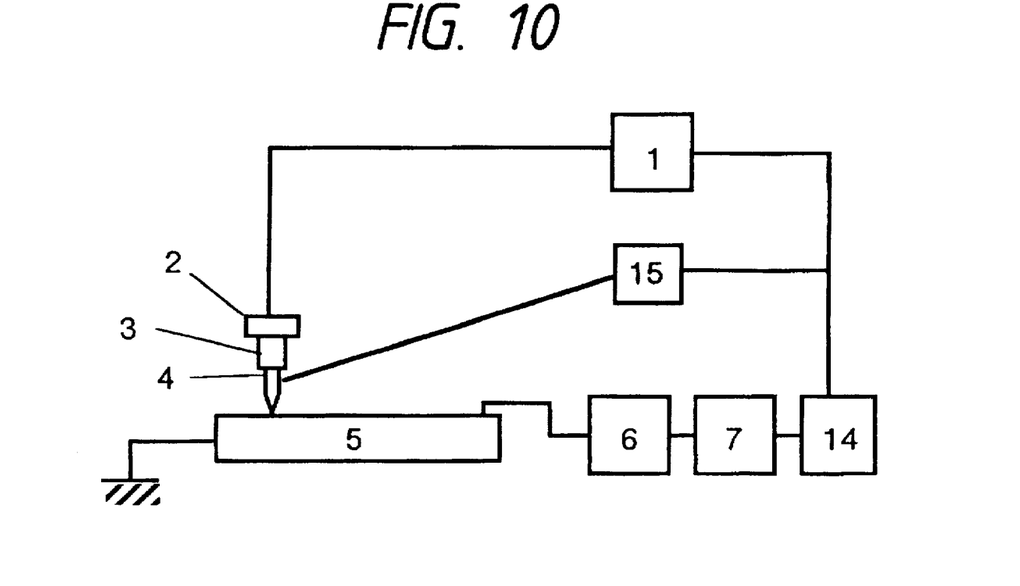
FIG. 10 is a block diagram of the apparatus of Embodiment 3 of the present invention.
Figure 11:
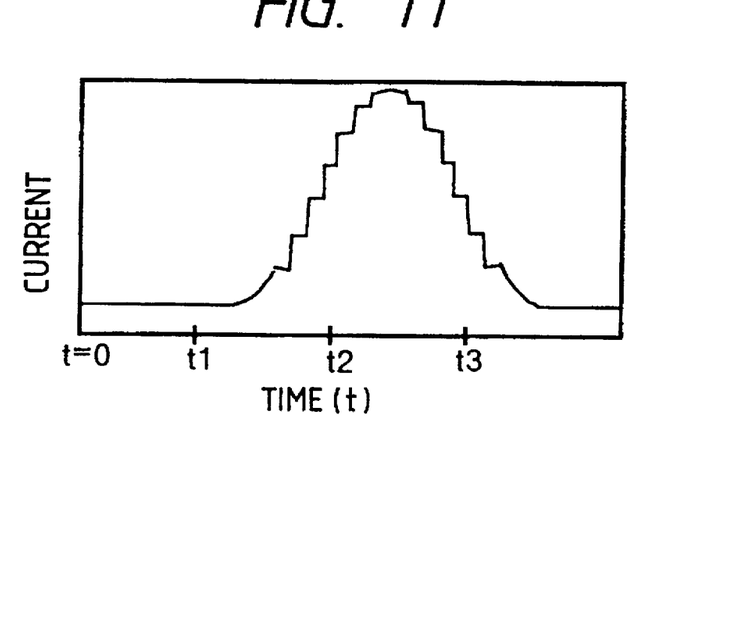
FIG. 11 is a drawing showing a quantum wave which is observed in Embodiment 3 of the present invention.

In this embodiment, an apparatus (FIG. 10) such as that shown in Embodiment 2 but having only one probe is used, and a quantum wave of magnetic flux is observed. The structure of the device to be measured in this embodiment is the same as that shown in FIG. 2. When a suitable pulse voltage is applied to the electrodes 8 and 12, a change is caused in the current passing the paths 9 and 10, and magnetic flux is induced according to the current change rate. When this magnetic flux is quantized, a discontinuous current is induced and generated secondarily by this quantized magnetic flux sequentially. The time when the pulse voltage V is applied is taken as t=0. The probe which is brought close to a point on the line C is held from the point of time t=0 and the changes of the time and the signal are measured (FIG. 11). From this change rate of current, the situation of the quantum wave of magnetic flux can be known indirectly. The situation of the quantum wave may be observed by cooling the specimen 5 by the cooling means 16.

Embodiment 4

In this embodiment, a defect analysis of a memory device which is executed using the memory device as a specimen by using the measuring apparatus described in Embodiment 2 will be explained.

In this embodiment, there are two cases available depending on the part to be measured, such as one case for measuring when the probe 4 is brought close to the circuit of the memory device (specimen) 5, and another case for measuring when the probe 4 is in contact with the circuit. In the former case, a bias voltage is applied between the probe 4 and the part to be measured of the circuit of the memory device 5 by the pulse voltage source 6 and the pulse voltage continuous application control unit 7, and then a change in the signal which is caused by the voltage application by the two probes (tips) 4 held in the neighborhood of the surface of the memory device 5 by the control unit 1 of the scanning probe microscope, the coarse motion mechanism 2, and the micromotion mechanism 3, is measured by the signal measuring unit 15. In this case, the time from the first application of the pulse voltage to the change of signal is also measured by the time measuring unit 14. When the two probes (tips) 4 are in contact with the surface of the memory device 5, the aforementioned bias voltage is not applied.

The object of observation is a memory circuit with a line and space of about 0.05 micron, which cannot be observed by the stroboscopic SEM because the SN ratio is bad. A voltage is applied to the circuit by the pulse voltage source 6 and the pulse voltage continuous application control unit 7, and then a change in the signal which is caused by the voltage application by the probe (tip) 4 which is held by the control unit 1 of the scanning probe microscope, the coarse motion mechanism 2, and the micromotion mechanism 3 on the surface of the memory device 5 is measured. In this case, the time from the first application of the pulse voltage to the change of signal is also measured by the time measuring unit 14.

Each time a pulse voltage V is applied at a suitable interval, the operation status to be observed is generated.

Figure 12:
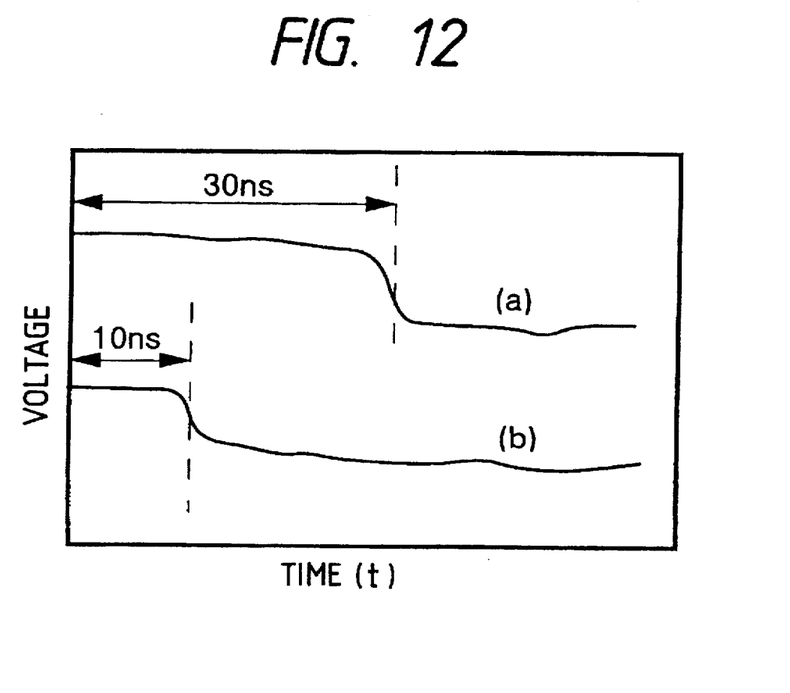
FIG. 12 is a drawing showing the potential which is observed in Embodiment 4 of the present invention.

The time when the pulse voltage V is applied is taken as t=0. The probe which is brought close to a point on the circuit at the same time is allowed to come in contact with the surface of the specimen from the point of time t=0 and held and the variation and time of the signal are measured (as shown at (a) in FIG. 12). The exactly same measurement is executed with another probe which is brought close to another point on the circuit (shown at (b) shown in FIG. 12). As clearly shown in FIG. 12, a defective part whose rising is late is detected as shown in (b) compared with the normal rising shown in (a).

What is claimed is:

1. A method for dynamic observation of a specimen, comprising the steps of:

setting an origin of time;

inputting a signal responsive to which a dynamic quantum wave is to be generated in a specimen;

generating the dynamic quantum wave in the specimen in response to the signal input in the inputting step; and detecting the dynamic quantum wave generated in the specimen as a function of time measured from the origin set in said setting step;

wherein the detecting step is performed by scanning the specimen with a probe having a needlelike shape; and wherein the detecting step detects the dynamic quantum wave as a probability distribution.

2. A method for dynamic observation of a specimen according to claim 1, wherein the detecting step is performed while cooling the specimen.

3. A method for dynamic observation of a specimen according to claim 1, wherein the inputting step inputs a pulse signal for generating the dynamic quantum wave in the specimen; the detecting step includes a step for scanning a surface of said specimen with at least one probe; and wherein said method executes said inputting step and said detecting step by synchronizing and applying a scanning signal for controlling the probe scanning and the pulse signal to said specimen.

4. A method for dynamic observation of a specimen according to claim 3, wherein the pulse signal input step includes a step for inputting a pulse electric signal in synchronization with said probe scanning for each pixel constituting a scanning area of said probe on the specimen surface at said detecting step.

5. A method for dynamic observation of a specimen according to claim 3, wherein said detecting step uses a plurality of probes and controls scannings of said plurality of probes on the specimen surface independently for each probe.

6. A method for dynamic observation of a specimen according to claim 5, wherein said detecting step includes a step for moving said plurality of probes to respective predetermined positions on the specimen surface, and a step for holding at least one of said plurality of probes at a respective one of said predetermined positions.

7. A method for dynamic observation of a specimen according to claim 1, wherein the inputting step and the detecting step are executed repeatedly by setting a signal input time of said inputting step as said origin of time.

8. A method for dynamic observation of a specimen according to claim 1, wherein the detecting step includes a step for measuring a change start time of the signal input in said inputting step, and a step for recording a variation of said dynamic quantum wave and the change start time of said signal.

* * * * *